Jan. 11, 1966  J. TUSA ET AL  3,228,048
MANUFACTURE OF SHOEMAKERS' LASTS
Filed May 23, 1962  2 Sheets-Sheet 1
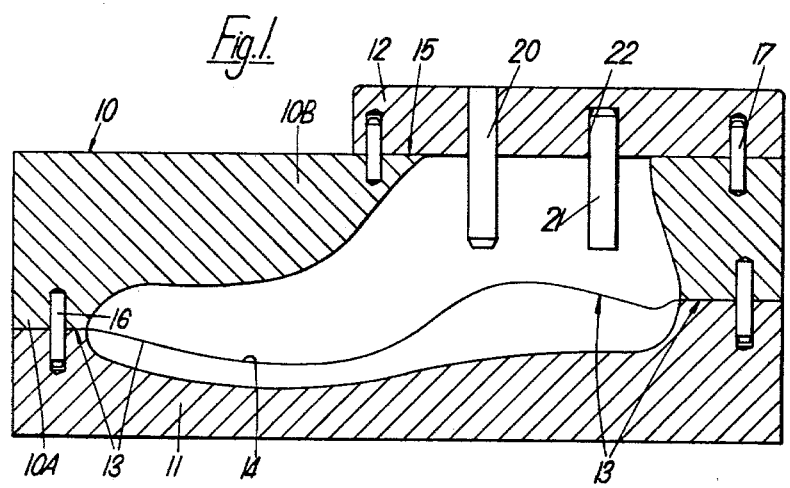
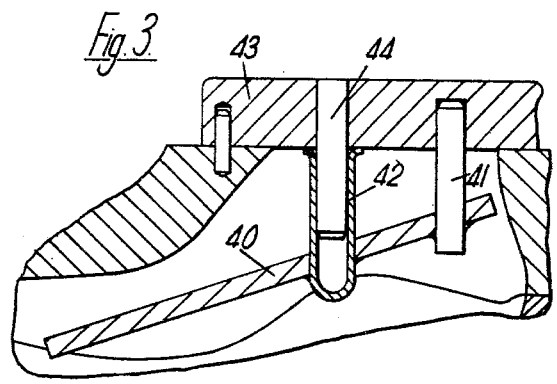

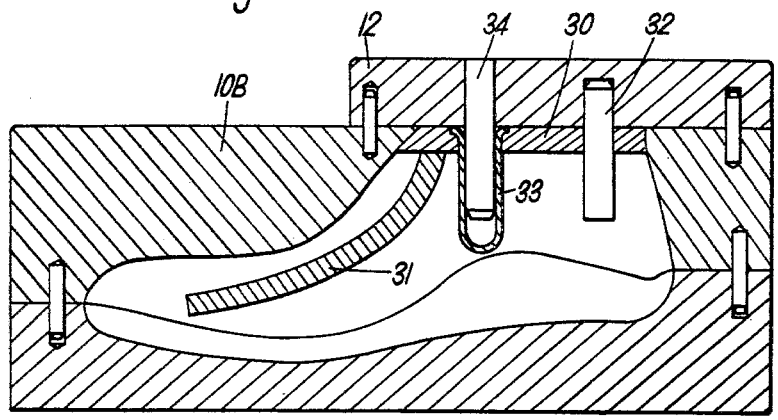
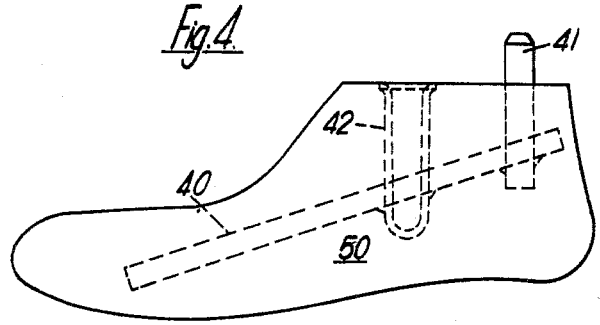

United States Patent Office 3,228,048
Patented Jan. 11, 1966

3,228,048
MANUFACTURE OF SHOEMAKERS' LASTS
John Tusa, Horndon-on-the-Hill, Essex, and Frank Vincent Maltby, Esher, Surrey, England, assignors to Bata Shoe Company Inc., Belcamp, Md.
Filed May 23, 1962, Ser. No. 197,083
Claims priority, application Great Britain, June 1, 1961, 19,752/61
2 Claims. (Cl. 12—133)

This invention relates to the manufacture of shoemakers' lasts. Such lasts comprise a foot which merges integrally into a neck, the foot being larger and broader than the neck, and the lasts must be strong and rigid and not unduly heavy.

The invention relates to a method of manufacturing a shoemakers' last or part thereof which comprises the utilisation in a mould of materials which react and become bonded to produce a rigid polyurethane foam structure of appropriate density.

The invention also relates to a last composed of a rigid polyurethane foam of appropriate density.

The invention also relates to a mould for manufacturing shoemakers' lasts composed of an organic plastic material and comprising a main hollow body partly formed to the shape of the upper surface of the foot portion of the last with a rim extending around the broadest outline of the foot portion and partly formed to the shape of the last neck portion with a rim at the level of the neck end, and closure plates applied to the foot portion and neck portion, with said closure plates having rims which are complementary to the rims of the foot and neck portions and are adapted to be sealed against said rims when the body and closure plates are held together.

The mould may include a closure plate for the neck portion provided with one or more pins projecting as a core or cores into the hollow mould interior to form one or more holes in the neck of the last.

The mould may include a closure plate for the neck portion having detachably fitted thereto a pin which is seated in a socket in said closure plate and projects from this socket into the hollow mould interior, the arrangement being such that this pin becomes embedded in, so as to project from, the neck of the moulded last.

There may be fitted into the mould interior so as to be seated upon the neck closure plate a caplike insertion to serve as a cap for the neck of the last.

There may be fitted into the mould interior a reinforcing tongue extending through the mould interior towards the toe of the last.

There may be incorporated in the plastic material a fibrous material such as felt or fleece, composed for instance of nylon, which serves both as a reinforcement and to increase the density of the composition.

Examples of a mould according to the invention for moulding a last are shown in the accompanying drawings in which:

FIG. 1 is a vertical longitudinal mid-sectional view of one form of the mould.

FIG. 2 is a view along the lines of FIG. 1 showing another form of mould;

FIG. 3 is a fragmentary sectional view of yet another embodiment; and

FIG. 4 is a side elevational view of a last made in the mould shown in FIG. 3.

With reference to FIG. 1, the mould comprises a main hollow body 10 and two closure plates 11 and 12. The body 10 consists of a foot portion 10A and a neck portion 10B. The foot portion 10A terminates in a rim 13 which extends around the broadest outline of the last to be moulded in simulation of the form of the human foot. Accordingly, the rim 13 is not a plane surface but undulates from end to end of the mould as the broadest outline rises and falls relatively to the bottom of the mould. The bottom closure plate 11 has a rim 14 which is complementary to the rim 13. The rim of the neck portion 10B is a flat face 15. The body 10 is provided with dowel pins 16 and 17 which project downwardly and upwardly respectively from the lower and upper rims 13 and 15 and which fit into locating holes in the rims of the closure plates. When the mould is closed and the closure plates 11, 12 are fitted to and clamped against opposite ends of the main body 10, the rims 13 and 15 are sealed by the closure plates.

In FIG. 1, there is formed on or fixed to the top closure plate 12 a depending pin 20 which projects into the mould interior. Moreover, a pin 21 is fitted into a socket 22 in the plate 12, with this pin projecting downwardly from the socket into the mould interior.

In use of the mould, the bottom closure plate 11 is applied to the body 10, the body filled with the raw plastic material and appropriate additives, and the top closure 12 plate is then fitted to the body. The mould components are held sealed tight by appropriate clamping means, and then the moulding operation is carried out with the plastic material becoming permanently set in a solidified condition. Thereafter, the closure plates are unclamped and removed and the moulded last withdrawn from the mould body.

The socket formed in the neck by the pin 20 and the pin 21 embedded in the neck are provided for attachment to conventional last conveying systems.

By having the rim 13 at the broadest outline of the last, removal of the last from the mould body 10 is facilitated, being free from obstruction by bulges and depressions in the contour of the last. Moreover, should ragged plastic material be formed in the surface of the last at the joint 13, 14, such material is at a zone which is most accessible for trimming.

In the mould shown in FIG. 2, a reinforcing insert is embedded in the plastic material and forms a cap 30 for the neck of the last. The cap 30 is fitted into the neck portion 10B so as to rest against the top closure plate 12. A tongue 31 serving as the last-reinforcement curves deep into the interior of the body 10 towards the toe. The cap 30 is provided with an outward projection 32 which corresponds to the pin 21 in FIG. 1. The cap also carries a depending ferrule 33 which provides a socket in the neck of the last, and a locating pin 34 projects from the plate 12 into the socket.

In the FIG. 3 embodiment, there is also a reinforcing insert embedded in the plastic material. The insert includes a metal plate 40 through which extend a pin 41 and a ferrule 42 with the pin and ferrule being welded to the plate. The pin 41 extends upwardly from the plate 40 so as to project from the neck of the moulded last. The ferrule 42 also extends upwardly from the plate a sufficient height to be flush with the surface of the neck. The top closure plate 43 is provided with a hole into which the pin 41 fits and a downwardly projecting pin 44 which registers with the ferrule 42 and serves to locate the reinforcing insert.

Any of the embodiments above specified can be modified to provide any appropriate arrangement of one or more sockets in the neck and/or one or more pins thereon and any appropriate reinforcing insert can be embedded in the plastic material.

The moulds specified are devised to be charged or filled with a composition which when moulded forms a rigid polyurethane foam, the last having the requisite strength and being satisfactorily light in weight, and the composition being such that the density of the moulded plastic material is to the order of 18 to 25 lbs. per cubic foot (0.3 to 0.5 gm. per cc.).

The rigid polyurethane foam may be derived from the polymerisation within the mould of a polyisocyanate (particularly a diisocyanate) with a polyester, a polyesteramide, or a polyether together with a selected proportion of water by which the density of the foam is determined. To ensure the requisite degree of rigidity, an appropriate strengthening additive, for example metallic soaps and/or metallic powders, may be included amongst the materials introduced into the mould to become bonded with the foam in the production of the structure of the last. One or more additives may also be included, for instance a blowing agent to produce a more open cellular structure of the foam and a stabilizer or regulator.

There may be incorporated in the plastic material a fibrous material such as felt or fleece, composed for instance of nylon, which serves both as a reinforcement and for increasing the density of the composition. Such fibrous material may be inserted in the mould before the introduction of the plastic material.

Plastic material other than polyurethane foam could be used in the moulds specified, provided that the material had the requisite strength and rigidity when moulded and was reasonably light. Where weight is not a primary consideration, other resins may be used, e.g. polycarbonate and epoxy resins. The composition may be introduced simply by filling the mould while the topmost closure plate is removed; or provision may be made for introducing the composition at any suitable point in the mould components.

Where the last has a cap with an inward reinforcing insert, the cap and insert may be composed of any suitable material, for instance metal or an appropriate material other than the material used for the last.

With reference to FIG. 4, the plastic material 50 of the last is of course in external form the counterpart of the interior of the mould according to FIG. 3, and the parts 40, 41 and 42 are all united with or embedded in the plastic material so as to form therewith a rigid unit. It will be apparent that in the simpler construction as obtained by use of a mould such for example as described with reference to FIG. 1, the moulded last would have at least one pin 21 projecting from its neck and at least one hole or socket therein (formed by the pin 20). Correspondingly, a last obtained by use of a mould as in FIG. 2 would include the cap 30, the reinforcing tongue 31, the pin 32 and the ferrule 33.

We claim:
1. A last comprising a body portion of a rigid polyurethane foam having a density of the order of 18–25 lbs. per cubic foot, said body portion including a neck portion, a reinforcing member embedded in the body portion, a pin extending from said member and projecting from the neck portion of the last, and a ferrule extending from said member to the surface of the neck portion.

2. A last comprising a body portion of a rigid polyurethane foam having a density of the order of 18–25 lbs. per cubic foot, said body portion including a neck portion, a cap on said neck portion, the cap having a reinforcing tongue extending through the body portion towards the toe of the last, a pin projecting from the cap, and a socket sunk into the cap.

References Cited by the Examiner
UNITED STATES PATENTS

| | | | |
|---|---|---|---|
| 810,594 | 1/1906 | Wright | 12—139 |
| 999,872 | 8/1911 | Redin | 12—136 |
| 2,330,260 | 9/1943 | Baxter | 12—133 |
| 2,521,072 | 9/1950 | Lovell | 12—133 |
| 2,602,193 | 7/1952 | Korkatti | 12—133 |
| 2,617,129 | 11/1952 | Petze | 12—140 |
| 2,800,685 | 7/1957 | Gaved | 18—42 |
| 2,850,752 | 9/1958 | Leahy et al. | 12—136 |
| 2,899,708 | 8/1959 | Donaldson et al. | 18—48 |
| 2,981,976 | 5/1961 | Maier | 18—42 |
| 3,013,306 | 12/1961 | Richie et al. | 18—48 |
| 3,067,442 | 12/1962 | Bialy et al. | 12—133 |
| 3,147,974 | 9/1964 | Tomarkin | 273—82 |
| 3,147,975 | 9/1964 | Gruss et al. | 273—82 |

FOREIGN PATENTS

| | | |
|---|---|---|
| 990,358 | 6/1951 | France. |
| 311,146 | 5/1929 | Great Britain. |

JORDAN FRANKLIN, *Primary Examiner.*

EDWARD V. BENHAM, DAVID J. WILLIAMOWSKY,
*Examiners.*